COMMUNICATION SWITCHING MARKER HAVING CONTINUITY TESTING AND PATH CONTROLLING ARRANGEMENT

Filed Aug. 20, 1964

7 Sheets-Sheet 1

INVENTOR.
JOHN G. VAN BOSSE

BY C. A. Gulbrandsen
ATTY.

Oct. 24, 1967 J. G. VAN BOSSE 3,349,189

COMMUNICATION SWITCHING MARKER HAVING CONTINUITY TESTING AND PATH CONTROLLING ARRANGEMENT

Filed Aug. 20, 1964

7 Sheets-Sheet 2

Oct. 24, 1967 J. G. VAN BOSSE 3,349,189

COMMUNICATION SWITCHING MARKER HAVING CONTINUITY TESTING AND PATH CONTROLLING ARRANGEMENT

Filed Aug. 20, 1964

7 Sheets-Sheet 4

Oct. 24, 1967 J. G. VAN BOSSE 3,349,189

COMMUNICATION SWITCHING MARKER HAVING CONTINUITY TESTING AND PATH CONTROLLING ARRANGEMENT

Filed Aug. 20, 1964

7 Sheets-Sheet 6

United States Patent Office 3,349,189

Patented Oct. 24, 1967

3,349,189

COMMUNICATION SWITCHING MARKER HAVING CONTINUITY TESTING AND PATH CONTROLLING ARRANGEMENT

John G. Van Bosse, Park Ridge, Ill., assignor to Automatic Electric Laboratories, Inc., Northlake, Ill., a corporation of Delaware Filed Aug. 20, 1964, Ser. No. 390,835
6 Claims. (Cl. 179—18)

ABSTRACT OF THE DISCLOSURE

Apparatus for excluding a communication path between the two terminals in the crosspoint switching system if the link is busy, or there is no circuit continuity on a testing conductor, or if the particular link is excluded from the path availability in response to other conditions. An impedance circuit connected between a hold conductor of each link and a voltage source provides continuity testing of link busy testing leads which are connected to the hold conductors of the interstage links and are switched by a relay to a path selector. Detector devices interpret the continuity condition and forward the information to a path controlling arrangement for excluding the links having no continuity on their associated link test leads. The path controlling arrangement can also be selectively marked to exclude certain links from a communication path in response to other conditions. The path controlling arrangement indications and the link busy-idle indications provide the available communication paths which can be considered between the two terminals in the switching system.

This invention relates to a pathfinder arrangement for a communication switching network, and more particularly to a pathfinder arrangement for a crosspoint switching network.

A primary object of the invention is to control the number of available paths between particular terminals of a communication switching network.

Another primary object is to have signal indications for the testing and nontesting of the possible links between particular terminals of a switching network when such links are selected and tested for their availability in a path between terminals.

In U.S. Patent No. 3,275,752 by M. H. Esperseth et al., there is described a pathfinder system forming a part of the marker for a crosspoint type communication switching network, and the pathfinder arrangement described herein may be considered an improvement to a system of this general type.

A pathfinder arrangement for a communication switching system of the type used in the above-mentioned Spellnes et al. application includes a plurality of detector circuits, a plurality of coincidence gates, and a scanner circuit. The common control selects a group of possible links for a given connection between specific points of the communication system and connects the possible links through reed relay contacts to the plurality of detector circuits; a single link being connected to each detector circuit, for determining idle and busy of the link. The outputs of the detector circuits are connected to the inputs of the plurality of coincidence gates; each coincident gate including inputs from the outputs of the detector circuits corresponding to links comprising a single path between said specific points of the system when the links are tandem connected. The output of the coincidence gates indicate an available path when coincidence is present at the inputs. The scanner circuit chooses an available path and connects the links corresponding to the chosen path in tandem between the specific points of the communication system.

The detector circuits in the type of pathfinder arrangements as used in the said Esperseth et al. application do not discriminate between idle links and links which are not connected to their corresponding detector circuits due to inoperative connecting relays or an open circuit in a connecting lead. If a defective condition exists the detector would indicate and idle link and the circuit would not know that the link is not being tested. Consequently, the scanner thinking it sees an available path by the presence of coincidence may actually be choosing a busy path. In said Spellnes communication system, if the scanner in the first instance chooses a path having a busy link from a coincident gate indicating an available path, it will release itself upon discovery of this fact, and scan again until it reaches another gate which has coincidence. When time in making a connection is extremely important, a delay, even slight, may not be tolerable or desirable.

The above type of arrangements do not provide means for regulating the number of available paths between specific points in the system. Complete control over the number of available paths between specific points of the system is extremely advantageous when evaluating system operation, or in locating system failure.

A feature of the invention is to have an impedance means connected between each link and a voltage source. When a link and its corresponding impedance means are connected by a connecting means to a detector circuit, the link and its impedance means coacts with the input of the detector circuit to produce at the output of the detector circuit, signals indicating idle and busy links, and signals indicating the testing and nontesting of a link which has been selected to be tested for idle and busy by the detector circuit.

Another feature of the invention includes a signal generating means for generating a plurality of signals representing idle and busy links, for applying these signals to coincidence gates which indicate path availability between particular points in a switching system; one connection to each input of a coincidence gate for controlling the availability of a path when all other signals connected to be input have signals representing idle links. In effect the signal from the generating means could be used to disable a possible path between terminals of a switching system.

A further feature of the invention is the provision of a means for applying signals to the coincidence gates which indicate path availability between particular points of the communication system, to prevent coincidence of a gate which has idle signal indications from one or more links which have not been tested due to a discontinuity of a connecting means that connects a link with its corresponding detector circuit.

The details of the invention will be explained in the description which follows. Reference is made to the drawings in which:

FIG. 1 is a block diagram of a portion of a communication switching system including the switching network, the common control, line circuits, and terminal junctors.

FIG. 2 and FIG. 3 relate to the pathfinder.

FIG. 4 shows a switching matrix, a subscriber line and the common control logic for choosing the possible links between specific points of the switching system.

Figure 4:
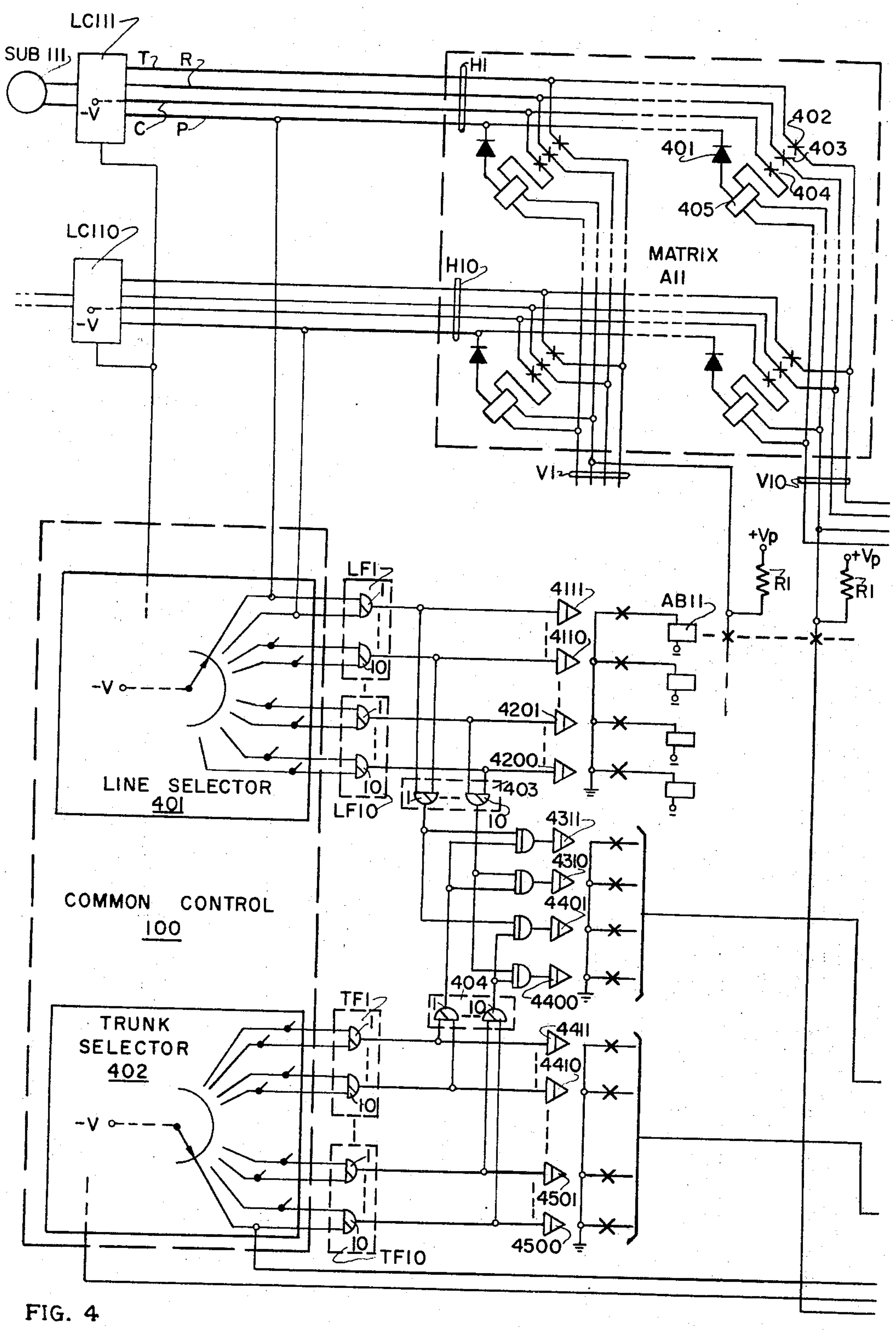
FIGS. 4, 5 and 6 illustrate the selection of one of the possible paths between a particular subscriber line and a particular junctor.
Figure 5:
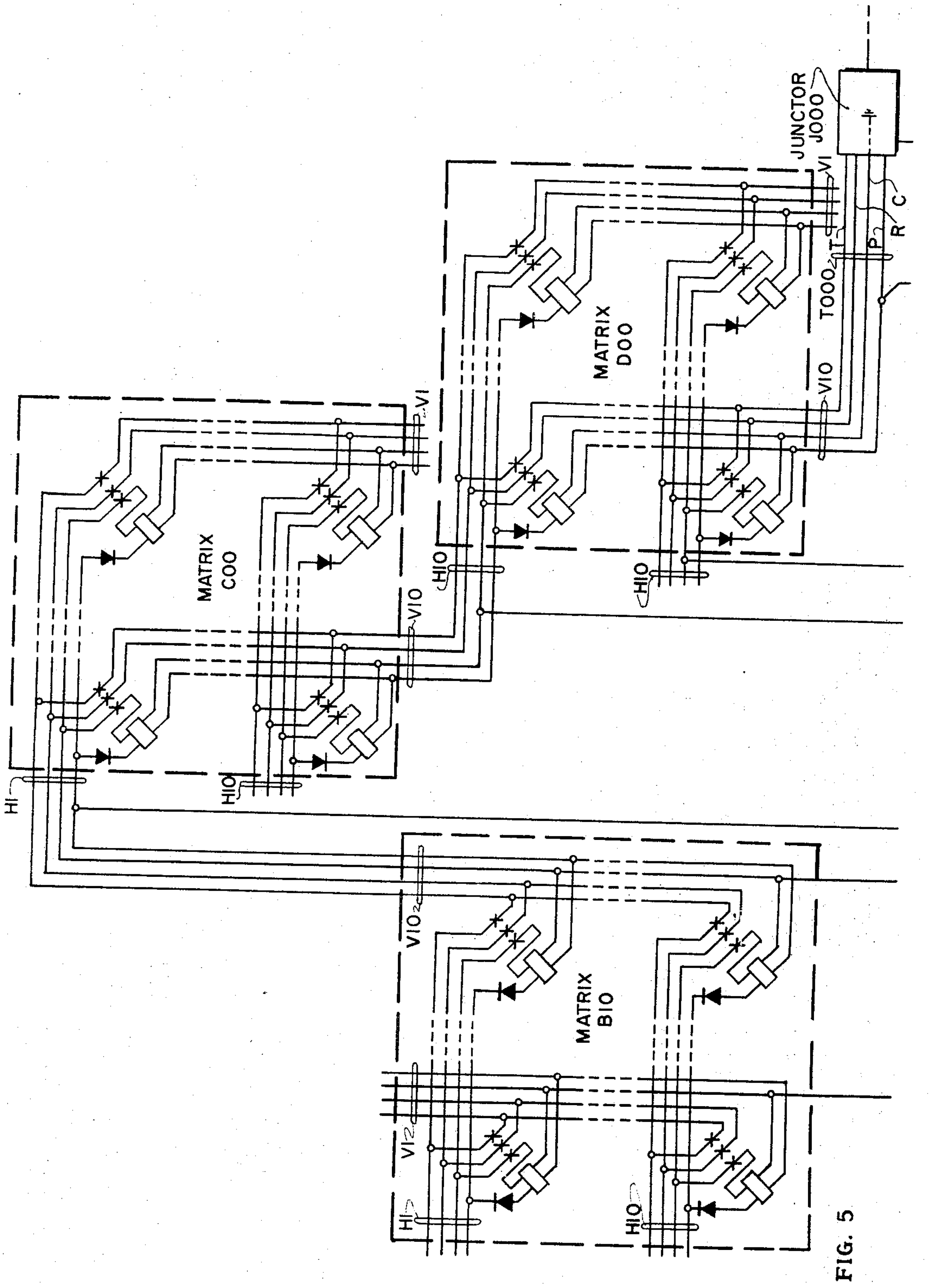

FIG. 5 when viewed with FIG. 4 shows one of a plurality of possible paths through the switching network between a subscriber and a junctor.

Figure 6:
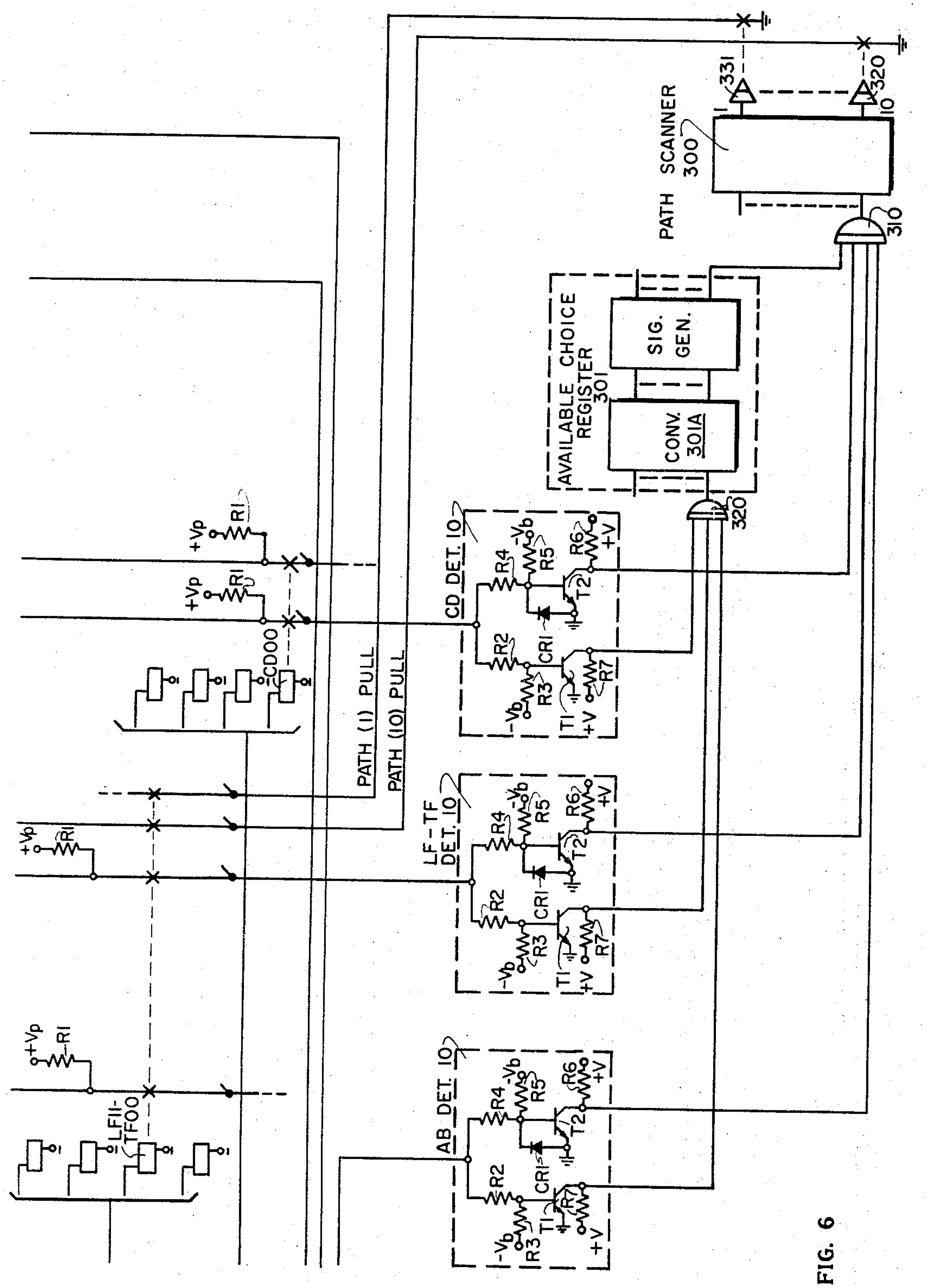

FIG. 6 illustrates the pathfinder circuitry which is utilized in determining the availability of the path through the switching matrices of FIGS. 4 and 5.

Figure 1:
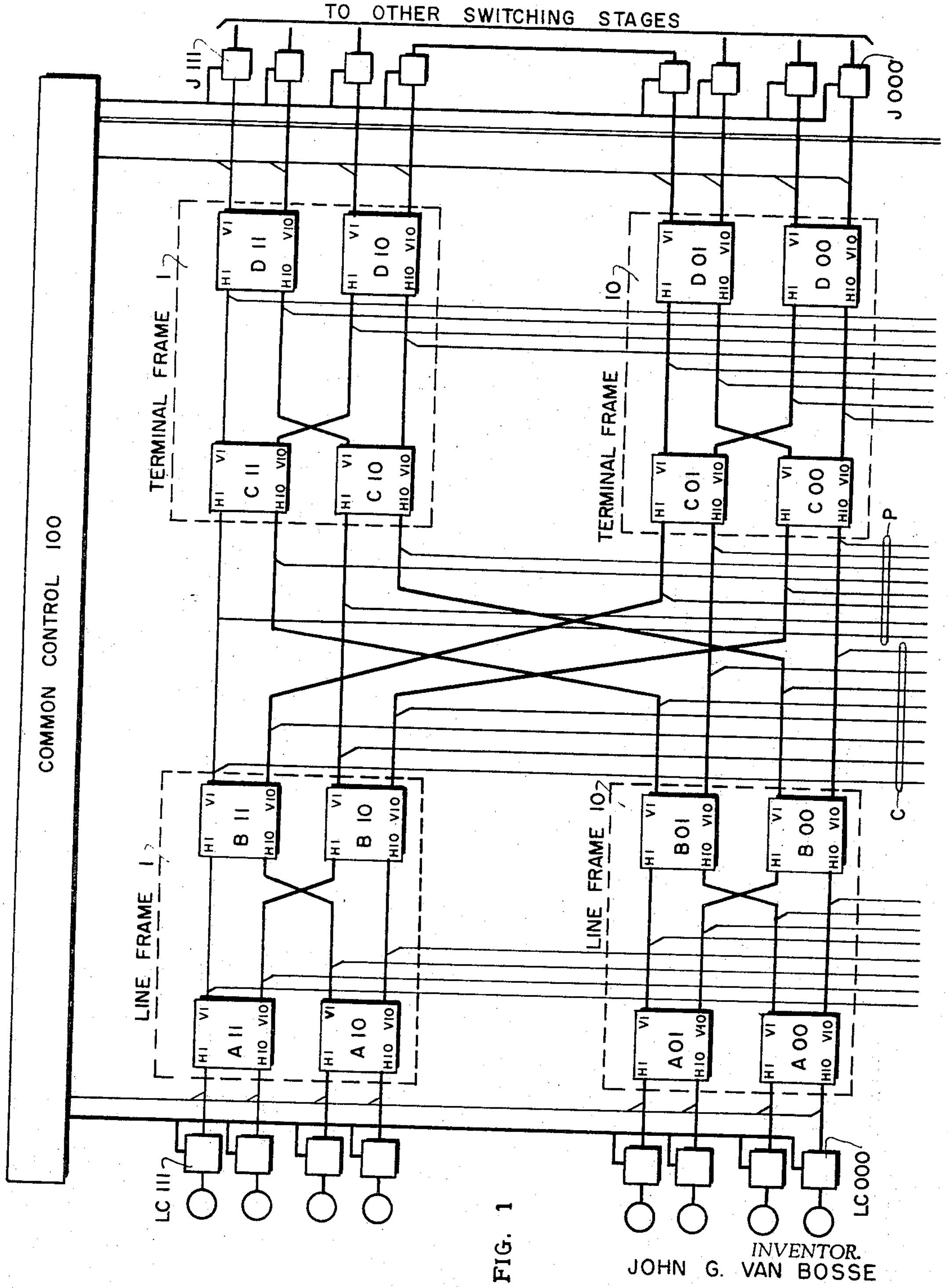
Figure 2:
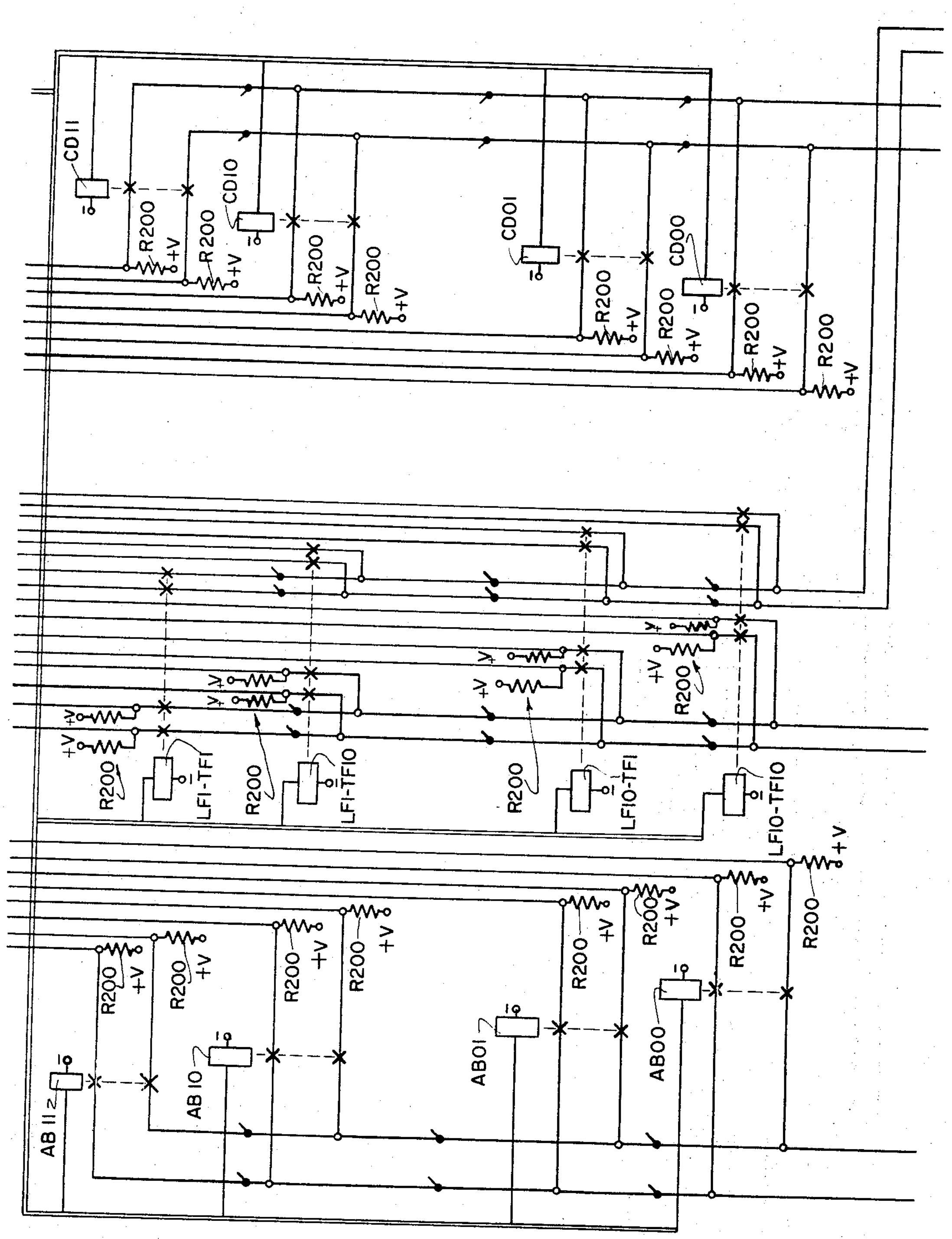
FIG. 2 illustrates the connecting means of the pathfinder arrangement which connects the links from the switching network to the link detector circuits.
Figure 3:
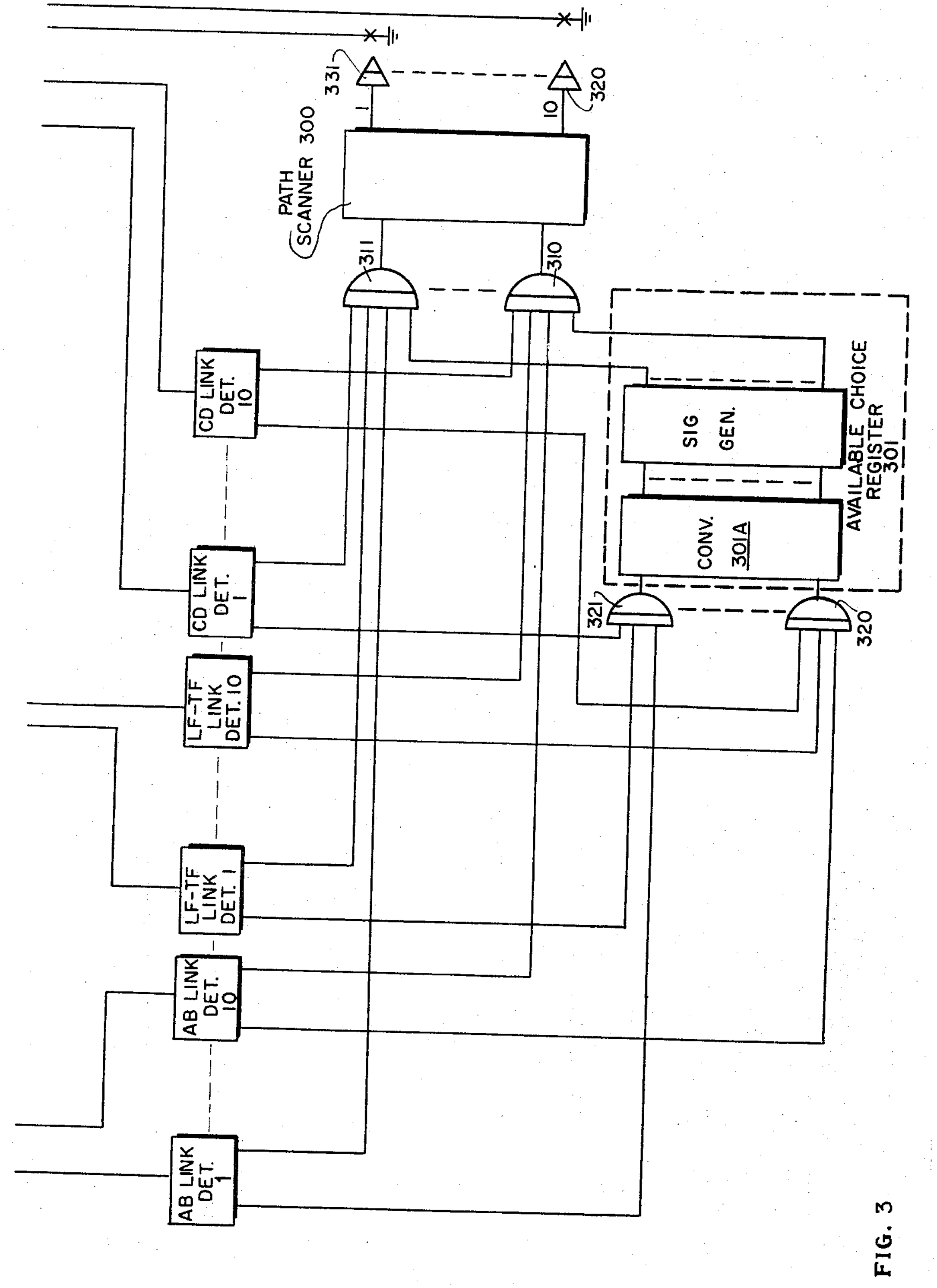
FIG. 3 illustrates in block diagram the connections of the pathfinder arrangement for controlling and choosing an available path between specific points of the communication switching system.
Figure 7:
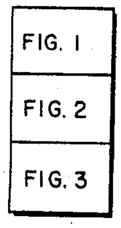

FIG. 7 shows the manner of arranging FIGS. 1, 2 and 3.

Figure 8:
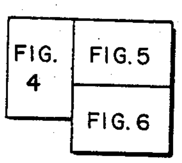

FIG. 8 shows the manner of arranging FIGS. 4, 5 and 6.

Figure 9:
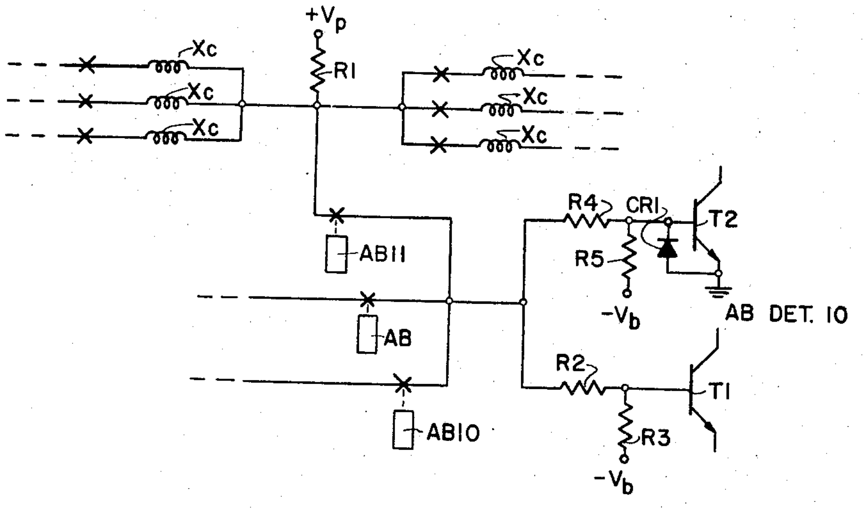

FIG. 9 illustrates the link detector circuit apart from the communication switching system.

FIGS. 1, 2 and 3 when considered together in the manner shown in FIG. 7 comprises a communication switching system which includes a switching network, a common control, and a pathfinder.

When the address is dialed into the circuit for a connection through the switching network, the common control connects an inlet line to the line frame and an inlet line to the trunk frame. The pathfinder determines the links for possible paths between the line connected to the line frame and the line connected to the trunk frame, and after selecting an available path frome one of the possible paths, it connects the path through the switching network. If a subscriber having access to the line frame desires connection to a line in the same office, the common control and pathfinder connects a path from the subscriber to a line at the inlet of the trunk frame, and then connects another path from the inlet line of the trunk frame to the desired line. If a subscriber desires a connection to a line outside of the office, the common control connects the path to a remote office.

The switching system illustrated in the drawings has a thousand lines with access to the line frames and a thousand lines with access to the trunk frames; a hundred lines per frame and ten lines per matrix.

FIGS. 4, 5 and 6 when considered together in the manner shown in FIG. 7 illustrate a single path connected through the switching network as determined by the common control and pathfinder.

For convenience in the drawings, the logic gate circuits in FIG. 4 have been represented by AND gates and OR gates. The AND gates will give a 1 or true output when all inputs are 1 or true, and the OR gates will give a 1 or true output when any one input is 1 or true.

A relay driver circuit is represented by a triangle having a line therein parallel to its base with a single input to the base, and a relay contact adjacent to its apex.

*Switching system*

In a crosspoint switching network of the type discussed in the above-mentioned U.S. Esperseth application, the network for connecting points between the network comprises a plurality of coordinate matrices; each matrix having a connecting means at each crosspoint so that one line may have access to a multiple number of coordinate matrices. FIG. 1 shows a block diagram arrangement of cascade connected matrices wherein any inlet line to the line frame could be connected to any inlet line of the trunk frame and vice versa. The Esperseth type of crosspoint system uses correed relays, and each inlet line of the line and trunk frames shown in FIG. 1 would be representative of four lines. FIG. 4 illustrates the crosspoint matrix arrangement using correed relays. The correed relay is discussed below. There are other networks that use breakdown devices rather than relays for the connecting means.

A line frame comprises a group of A matrices, a group of B matrices, and a portion of the total inlet lines to the line frame. A trunk frame comprises a group of C matrices, a group of D matrices and a portion of the total inlet lines to the trunk frame.

The switching system illustrated in the drawings has a thousand lines going into the line frame and a thousand lines going into the trunk frame; a hundred lines per frame and ten lines per matrix.

Referring to FIG. 1, the particular switching network shown has ten line frames, line frame 1 to line frame 10, and ten trunk frames, trunk frame 1 to trunk frame 10. Each line frame has ten A matrices, A11 to A10 for line frame 1 and A01 to A00 for line frame 10, and ten B matrices, B11 to B10 for line frame 1 and B01 to B00 for line frame 10. Each trunk frame has ten C matrices, C11 to C10 for trunk frame 1 and C01 to C00 for trunk frame 10, and ten D matrices, D11 to D10 for trunk frame 1 and D01 to D00 for trunk frame 10. Each matrix has ten horizontal lines, H1 to H10, and ten vertical lines V1 to V10. A single horizontal line has ten crosspoints to ten vertical lines, and each vertical line has ten crosspoints to ten horizontal lines. The common control connects points to the inlet lines of the line and trunk frames when a connection to the switching network is desired.

Each A matrix has a link to every B matrix of its frame; each D matrix has a link to every C matrix of its frame; each B matrix has a link to every trunk frame; and each C matrix has a link to every line frame. Since FIG. 1 has ten B matrices, ten C matrices, ten links from one A matrix to the B matrices of the same frame, ten links from a D matrix to the C matrices of the same trunk frame, ten links from one line frame to each trunk frame, there will be ten possible linking paths from a point P connected to an inlet line of the line frame to a point P' connected to an inlet line of the trunk frame. The addresses for points P and P' determine uniquely which group of ten-AB links, ten line frame to trunk frame links and ten-CD links could be used for the connection.

If, instead of the above value for frame and matrices, there were X line frames, Y trunk frames, *m*B matrices, *m*C matrices, *m* links from one A matrix to the B matrices of the same frame, *m* links from a D matrix to the C matrices of the same trunk frame, *m* links from one line frame to each trunk frame, there will be *m* possible linking paths from point P of the line frame inlet lines to a point P' of the trunk from inlet lines.

The addresses for the lines connected to the line and trunk frames determine the group of links which are connected to the pathfinder for path selection. In a telephone communication switching system the address for the subscriber and the junctor determine the group of links which are connected to the pathfinder for path selection.

A line circuit referred to as LC111 in FIG. 1 and FIG. 4 provides a connection from a subscriber to switching equipment, and includes a line relay and cutoff relay. The line circuit is connected by the common control to an A matrix. The line relay which is connected to the T and R conductor leads of FIG. 4, becomes energized when a subscriber requests transmission and signals the the line selector in the common control of the request by closing a set of contacts. The coil of the cutoff relay is connected on one side to a C lead and on the other side to a potential, and operates when ground is applied to the C lead after a path has been selected. When the cutoff relay operates, it disconnects the line relay, removing thereby the request for service signal. The cutoff relay becomes deenergized when ground is removed from the terminating junctor.

A junctor circuit referred to as J000 in FIG. 1 and FIG. 5 provides a connection to switching equipment for the purpose of making a connection to a subscriber from the same office or other offices. The junctor circuit, when connected by the common control to a D matrix of a trunk frame, provides ground for the C lead of the link from the D matrix to operate the hold winding of the associated correed relay so links through the switching system when connected in tandem will remain connected after the voltages energizing the pull winding are removed. When the junctor removes ground the links of the disconnected path become available for other connections.

If a local subscriber is seeking service, the common control selects a free junctor, and the address of the local subscriber and junctor determines the available paths from which the pathfinder will select a single path through the switching network. If a line is seeking a connection to a subscriber of the local system, the junctor puts in a request for service to the common control, the common control selects the desired subscriber, and the address of subscriber and junctor determines the available paths from which the pathfinder will select a single path.

*Reed relay*

FIG. 4 illustrates the switching network using correed relays for crosspoint switching. A correed relay is an electromagnetic device comprising one or more reed capsules surrounded by magnet coils. A typical correed relay has two windings, an operate or pull winding, a hold winding, and three contacts: two of the contacts switch the transmission path under control of the pull winding; the third contact locks the correed in its operated position when the hold winding is energized. A more detailed discussion of the correed and its use in the Electronic Automatic Exchange developed by Automatic Electric Laboratories could be found in the IEEE Conference Paper, CP–63–1059, titled "Switching Units and Trunking for an Electronic Exchange" by Klees and Sikorski, and in the above-mentioned Esperseth et al. application. Referring again to FIG. 4 there are four leads to each of the inlet lines into the line and trunk frames and four leads for a link between matrices: a lead P, connected to the relay pull or operate winding, which operates when the common control applies both ground and voltage to the pull winding; a second and third lead, T and R, connected to the contacts of the relays for connection through the switching system when a path has been selected, and is controlled by the pull winding; a fourth lead C, connected to a third contact in series with the hold winding of the relay and locks the relay when the pull winding is energized, and keeps the relay locked until the hold circuit is opened, upon completion of a call. Correed relays having more than three contacts are also used in switching circuits.

*Common control*

The common control comprising a line selector and a trunk selector, connects lines to the line frame and trunk frame for connection through the switching network when an available path has been selected. In a communication system relating to a telephone system, the subscriber lines are connected to the line frames and junctors are connected to the trunk frames.

The common control provides a unique identification of one line from the total number of inlet lines to the line frames, and a unique identification of one line from the total number of inlet lines to the trunk frames. In the event of a simultaneous request for service by two or more lines, all lines but one are excluded from the selection of an available path.

The address for the lines which the common control connects to the line and trunk frames determine uniquely the group of AB links, the group of line frame-trunk frame links, and the group of CD links, which could be used for possible paths through the switching network.

The line selector when receiving a request for service signal from the line circuit of the subscriber line, scans the P leads of the system and stops when it reaches the specific P lead requesting service, and applies a potential −V, thereto. If instead of receiving a request for service, a particular subscriber line in the office is sought for connection thereto, the common control causes the line selector to stop at the line and apply a voltage to its P lead.

When a subscriber requests service, the common control causes the trunk selector to choose an idle junctor in accordance with the address dialed. Some junctors may connect only within the office, and others may be able to connect to remote offices. If a junctor requests service through the switching system, the common control will react by having the trunk selector apply a voltage to the P lead of the junction, and the line selector apply a voltage to the P lead of the dialed subscriber line.

For a more detailed discussion of the switching network, the line circuit, the junctor, the common control and other aspects of a telephone switching system refer to the above-mentioned Esperseth et al. application, IEEE Conference Paper CP–63–1059, "Switching Units and Trunking for Electronic Automatic Exchange," IEEE Conference Paper CP–63–1060, "Switching Unit Markers for Electronic Automatic Exchange."

*Pathfinder*

The pathfinder includes a link selector means, a switching facility, a plurality of detector circuits, a first plurality gates, a second plurality of coincidence gates, an available choice register and a scanner circuit.

Each group of links chosen for possible paths between particular points of the switching network is selected by the link selector means and connected via the switching facility to the plurality of detector circuits. A detector circuit has two outputs; a first output for indicating link test and a second output for indicating link idle and busy. The first output of the detector circuit reads a 1 or true when the switching facility is connected to the detector circuit regardless whether the link is idle or busy. The second output of the detector circuit reads a 1 or true when the link connected to its input is idle, and a 0 or false when the link is busy. Therefore, if a contact of the switching facility is closed and connects the link to the detector circuit and the link is busy, both the first and second outputs will be 0 or false.

In FIGS. 1, 2, and 4 the C lead of a link is connected via resistor R1 to a potential of $+V_p$. Each detector circuit, as illustrated in FIG. 6, has two transistors, T1 and T2. The voltage $+V_p$, $-V_b$ and resistors R1, R2, R3, R4 and R5 are dimensioned so that when a contact from the switching facility which connects a C lead to a corresponding detector circuit is open, T1 and T2 will be nonconducting. If a switching contact is closed, T1 will be conducting whether the C lead is idle or busy, but if the C lead is busy both T1 and T2 will be conducting. When T1 is conducting, it indicates that the link is actually being tested. The prime function of the coaction of $+V_p$ and R1 with the input circuitry is that it enables the detector circuit to give an indication that the link is being tested in addition to whether the link is idle or busy.

FIG. 9 illustrates the link detector arrangement apart from the entire communication switching system. Refer to FIG. 9 in conjunction with FIGS. 4, 5 and 6. Coil winding Xc refer to the coils of the relays which provide a path through the matrices via the links between such matrices. The impedance circuit including $+V_p$ and R1 is tied to a vertical line and is in common with ten horizontal lines of the particular matrix to which it corresponds. Each link tester has a transistor T1 and T2. The voltages $+V_p$ and $-V_b$ and the resistors R1, R2, R3, R4, and R5 are dimensioned to provide the following condition:

(1) When all contacts from the AB relay are open T1 and T2 will be turned off for a logic 1 at each transistor output;

(2) When one contact from an AB relay is closed, T1 will be turned on for a logic 0 at its output regardless whether the link is idle or busy; and (3) When one contact from an AB relay is closed and the link is busy, both T1 and T2 will be on for a logic 0 at each transistor output.

By having T1 "on," this signifies that a link is actually being tested regardless whether the link is idle or busy. In this manner, the system will not get a false indication that a link is idle when in fact it is busy when no connection is made for testing the availability of such link.

The first outputs of the link detector circuit corresponding to links comprising a single path when connected in tandem, are tied to the inputs of one of a plurality of first gating means. Each gating means corresponds to a single possible path and responds to AND gate logic. When all inputs to the gating means have signals corresponding to link test, the output of the gating means will give a signal indicating that all links for a specific path are being tested. A link being tested is represented by a logic 0 and a link not being tested is represented by a logic 1. The output of a single gating means will indicate a 0 signal when all links are being tested and a 1 signal when any one link is not being tested due to a faulty relay or a lead causing a discontinuity in the connection between the link and the detector circuit. The number of first gating means depends upon the possible paths between any two points of the switching system.

The second outputs of the link detector circuits for links corresponding to a single path through the switching network when connected in tandem, are tied to the inputs of one of said second gating means. Each gating means corresponds to a single possible path and responds to AND gate logic. The number of such gating means depends upon the possible paths between any two points of the switching system. When all inputs to a gating means have signals corresponding to idle links, the output of the gate will indicate an available path signal. Idle links are represented by a logic 1 or true signal, and a busy link by a logic 0 or a false signal. The gate will indicate a true output signal when all links of a path are idle, and a false output signal if any one link of a path is busy.

An available choice register is connected to the inputs of the second gating means via a plurality of connecting leads; one lead to each gate. The available choice register includes a signal generating means and a converting means. An advantage of such an available choice register is that it would be located at the central control location of the system.

The signal generating means generates a plurality of signals representing idle and busy links which corresponds to signals of logic 1 or true and 0 or false. Each of said plurality of connecting means connects the signal generating means to the input of the second gating means. If it is desired to eliminate certain paths between particular points of the switching system, due to test reasons or circuit evaluations etc., a false signal is applied to the input of the gating means from the signal generating means, and the path thereby becomes unavailable as a path choice because the gate will no longer be able to realize coincidence.

Each of the converting means of the available choice register is connected on one side to an output of a first gating means having inputs from the outputs of specific detector circuits and on the other side to a connection from the signal generating means attached to a second gating means having inputs from the same specific detector circuits. A converting means takes the signal from the output of the second gating means and converts it to signals representing idle and busy links; an idle link from the first output of the detector circuit corresponds to a 1 or true, and a busy link corresponds to a 0 or false. If the output of a first gating means is 0, the link for a path are all being tested, and if the output is a 1, one or more links of a path are not being tested. The converting means takes a 1 signal and converts this to a 0, for applying the 0 signal to the first gating means to prevent the second gating means from indicating an available path when all other inputs are 1, so that a possible path will not be available if any link of a possible path has not been tested by the detector circuit. If all links of a path are tested as is indicated by a 0 output of the first gating means, the output of the converting means, for this condition, will have no effect on the AND gate logic of the first gating means.

A scanner circuit is attached to the output of the first gating means to select an available path between the subscriber and junctor from the outputs which indicate an available path. Upon selection, the scanner circuit connects the selected path through the switching network by applying a ground on the C lead of the link between the B and C matrix.

With reference to FIGS. 1 and 2, relay AB11 connects the AB links between matrix A11 and the B matrices of line frame 1 to the AB link detector; relay AB10 connects the AB links between matrix A10 and the B matrices of line frame 1 to the AB link detector; relay AB01 connects the AB links between matrix A01 and the B matrices of line frame 10 to the AB link detector; and relay AB00 connects the AB links between matrix A00 and the B matrices of line frame 10 to the AB link detector. Relay LF1–TF1 connects the BC links between line frame 1 and trunk frame 1 to the BC link detector; relay LF1–TF10 connects the links between line frame 1 and trunk frame 10 to the BC link detector; relay LF10–TF1 connects the links between line frame 10 and trunk frame 1 to the BC link detector; relay LF10–TF10 connects the links between line frame 10 and trunk frame 10 to the BC link detector. Relay CD11 connects the BC links between matrices C11 and D11 to the CD link detector; relay DC10 connects the BC links between matrix D10 and the C matrices of trunk frame 1; relay DC10 connects the DC links between matrix D10 and the C matrices of line frame 1; relay DC01 connects the DC links between matrix D01 and the C matrices of line frame 10 to the DC link detectors; relay DC00 connects the DC links between matrix D00 and the C matrices of line frame 10 to the DC link detectors.

The AB11 relay operates if a subscriber line connected to the matrix A11 is seeking service or is sought to be reached by a local or outside line; AB10 operates if a subscriber line connects to matrix A10 is seeking service or is sought to be reached by a local or outside line; AB01 operates if a subscriber line connected to matrix A01 is seeking service or is sought to be reached by a local or outside line; relay AB00 operates if a subscriber line connected to matrix A00 is seeking service or is sought to be reached by a local or outside line. The DC11 relay operates when a line connected to matrix D11 is seeking service or is sought to be reached by a local line; relay DC10 operates when a line connected to matrix D10 is seeking service or is sought to be reached by a local line; relay DC01 operates when a line connected to matrix D01 is seeking service or is sought to be reached by a local line; relay DC00 operates when a line connected to matrix D00 is seeking service or is sought to be reached by a local line. The operation of the LF–TF relay depends upon the address of lines connected to the line and trunk frames; relay LF1–TF1 operates if a line connected to line frame 1 is seeking service to a line connected to trunk frame 1 or vice versa; relay LF10–TF10 operates if a line connected to line frame 1 is seeking service to a line connected to trunk frame 10 and vice versa; relay LF10–TF1 operates if a line connected to line frame 10 is seeking service to a line connected to trunk frame 1 and vice versa; relay LF10–TF10 operates if a line connected to line frame 10 is seeking service to a line connected to trunk frame 10 and vice versa. Since only one path connection is made at a time, there cannot be more than one AB relay, one LF–TF relay, and one CD relay in operation. The selected links from the switching network of FIG. 1 are connected to the detector circuits of FIG. 3 by the relays of FIG. 2. The number of AB link detector circuits corresponds to the number of AB links an incoming line to the line frame has access. Since an incoming line has access to ten AB links, there are ten AB link detector circuits. The number of BC links corresponds to the number of links going from one line frame to a terminal frame. Since each line frame has ten links to any trunk frame, there are ten BC link detector circuits. The number of CD links corresponds to the number of CD links an incoming line to the trunk frame has access. Since an incoming line has access to ten CD links, there are ten CD link detector circuits.

The ten links which are connected to the AB link detectors are controlled by a hundred relays. All the relays operation are controlled by the common control.

In FIG. 4, line 111 requests for service and the line identifier scans the P leads of the input lines to the line matrices to find the calling line in order to mark it with a true signal. When the P line is marked, the output of OR gate 1 of TF1 becomes true which will cause relay driver 4111 to operate relay AB11 which connects the C leads of the links between matrix A11 and the B matrices of line frame 1 to the AB detector circuits. The terminal selector also responds to line 111's request for service and selects an idle junctor which is shown in FIG. 5 and designated junctor 000 and marks its P lead true. When the P lead is marked, the output of OR gate 10 of TF becomes true which will cause relay driver 4500 to operate relay CD00 in FIG. 6 which connects the C leads of the links between matrix D00 and the C matrices of line frame 10.

FIG. 3 shows AB link detector 1 through AB link detector 10, BC link detector 1 to BC link detector 10, CD link detector 1 to CD link detector 10. The first output of the link detectors are connected to a second plurality of coincidence gates, 321 to 320.

The outputs of the coincidence gates are connected to the available choice register, 301. The second outputs of the link detectors are connected to the first plurality of detector circuits, 311 to 310. The available choice register has connections to each of the second plurality of coincidence gates. The outputs of the first coincidence gates are connected to the path scanner 300. The path scanner is connected to relay drivers 331 to 320. When the relays corresponding to the relay drivers ground is applied to a C lead of a link between a B and a C matrix.

FIGURE 6 illustrates the pathfinder circuitry for a single path between subscriber and junctor. AB Det.10, BC Det.10, and CD Det.10 have connections to AND gate 320 and AND gate 310. The drawings also include as in FIG. 3, available choice register 301, and path scanner 300, relay drivers, and relay contacts having grounds.

While the present invention has been described with respect to a particular embodiment this description is intended in no way to limit the scope of the invention.

What is claimed is:

1. In a communication switching system operative to establish connections between a first set of terminals and a second set of terminals through a plurality of switching stages arranged in tandem between terminals of the first set and terminals of the second set, each of said stages having a plurality of relays arranged in coordinate arrays, each relay including a hold winding, with a normally open set of its hold path contacts connected in series with its hold winding, interstage links interconnecting adjacent stages, each including a hold conductor interconnecting the series combination of the hold winding and the normally open contacts of a relay in each of the adjacent stages, each said set of interstage links having a set of link test leads connected to respective hold conductors, busy links having the hold path contacts closed at each end and having holding current flowing through the hold windings to cause a given potential to appear on the hold conductor, and connect means operated during the testing for selecting a group of possible links for a given connection and for connecting the link test leads thereof to individual inputs in a path selector; the improvement comprising:

means to apply a test potential via impedance devices to each said hold conductor of each interstage link; and a detecting means to test for the presence of said test potential at said path selector inputs via said connect means to thereby determine the continuity of said link test leads.

2. In a communication switching system, the combination as claimed in claim 1, wherein said detecting means determination of the continuity is indicated by an output signal, and further including:

a plurality of gating circuits, each having a plurality of inputs and an output, said inputs connected to said detecting means outputs;

a path controlling means having a plurality of inputs connected to each of said plurality of gating circuit outputs, said controlling means operated in response to said gating circuit outputs to generate a signal to said path selector to thereby exclude those links from the path selection having no continuity on the associated link test leads.

3. In a communication switching system, the combination as claimed in claim 2, further including:

a path scanning means having inputs connected to said second path controlling means outputs and having means to extend an operating potential to a selected path.

4. In a communication switching system, the combination as claimed in claim 3, wherein said path control means further includes:

a means selectively operated to generate signals at said path control outputs to exclude certain paths between particular terminals in the switching system and to assign a specific path for certain terminals in the switching system.

5. In a communication switching system, the combination as claimed in claim 4, wherein each said detecting means also includes a second output for indicating the busy-idle condition of said links, and further including a second plurality of gating means each having a plurality of inputs and output, at least a first one of said plurality of inputs of each of said gating circuits connected to said second detector output, and a second one of said plurality of gating means inputs connected to said corresponding path controlling means output, said inputs dependent on the link availability condition and the link test lead continuity to provide at their associated gating means outputs connected to said path scanning means, the path availability information between particular terminals of said first and second set.

6. In a communication switching system operative to establish connections between a first set of terminals and a second set of terminals through a plurality of switching stages arranged in tandem between terminals of the first set and terminals of the second set, each of said stages having a plurality of relays arranged in coordinate arrays, each relay including a hold winding, with a normally open set of its hold path contacts connected in series with its hold winding, interstage links interconnecting adjacent stages, each including a hold conductor interconnecting the series combination of the hold winding and the normally open contacts of a relay in each of the adjacent stages, each said set of interstage links having a set of link test leads connected to respective hold conductors, busy links having the hold path contacts closed at each end and having holding current flowing through the hold windings to cause a given potential to appear on the hold conductor, and connect means operated during the testing for selecting a group of possible links for a given connection and for connecting the link test leads thereof to individual inputs in a path selector; the improvement comprising:

an impedance circuit connected between each link and a voltage source, to provide, via the selected link test leads connected by said connecting means to said selector, signals indicative of the continuity of the corresponding test leads through said connecting means;

a plurality of groups of link detector devices, each having an input individually connected to a link test lead of the respective groups of interstage links, and a first and second output for each detector device, said first output having signals indicative of the continuity of said link test lead, said second output having signals indicative of the busy-idle condition of the link;

a first plurality of gating circuits, each having a plurality of inputs and an output, at least one of said plurality of inputs of each of said gating circuits connected to said first output of at least one detector of each said group of detectors;

a path control means having inputs from said first plurality of gating circuit outputs, a signal generating means, and a plurality of outputs, said first plurality of gating circuit outputs operative to control said plurality of outputs depending on the link test lead continuity indication, said signal generating means operative to also control said plurality of outputs responsive to other conditions;

a second plurality of gating circuits each having a plurality of inputs and an output, at least one of said plurality of inputs of each of said gating circuits connected to said second outputs of at least one detector of each of said group of detectors and one of each of said second gating circuit inputs connected to said path control outputs, said gating circuit outputs having signals representative of an available path between said first and second terminal in the system if the path is idle, and available, and a path scanner having inputs connected to said second gating circuit outputs and having means to extend an operating potential to a selected path.

References Cited

UNITED STATES PATENTS

| | | | |
|---|---|---|---|
| 3,210,478 | 10/1965 | Klees et al. | 179—18 |
| 3,249,699 | 5/1966 | Mol et al. | 179—18 |
| 3,288,939 | 11/1966 | Spellnes | 179—18 |
| 3,311,883 | 11/1966 | Schmitz et al. | 179—18 |

KATHLEEN H. CLAFFY, *Primary Examiner.*

L. A. WRIGHT, *Assistant Examiner.*